Jan. 5, 1954  J. MARTIN  2,665,089
EJECTION SEAT FOR AIRCRAFT
Filed May 22, 1951  5 Sheets-Sheet 3
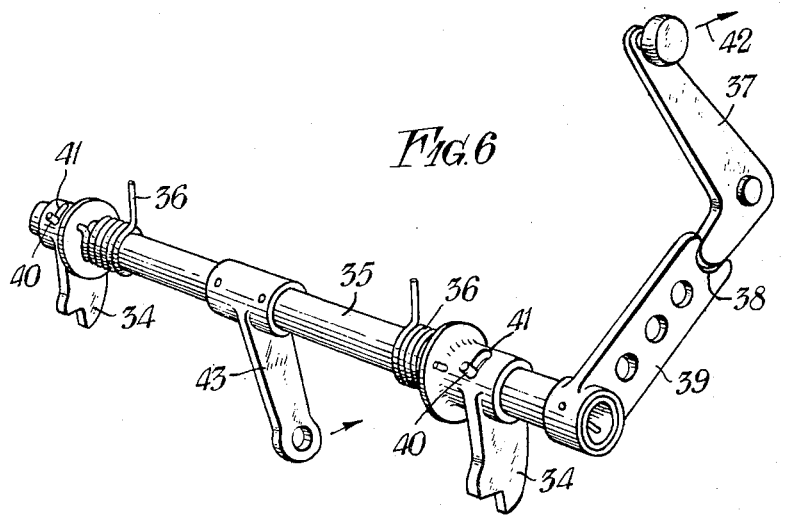
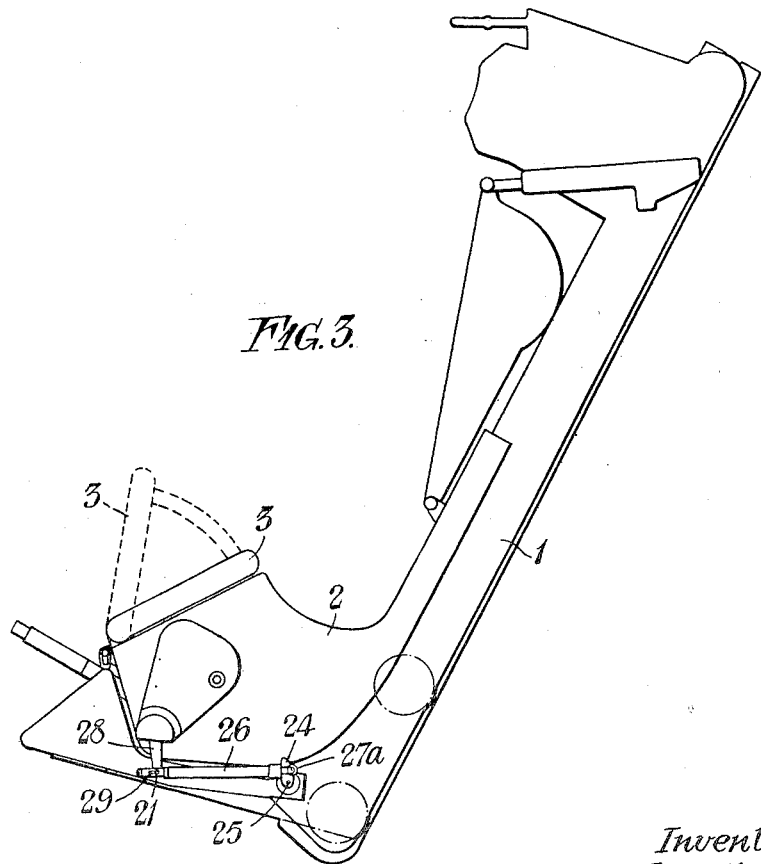
Inventor
JAMES MARTIN.
per Worth Wade
Attorney.

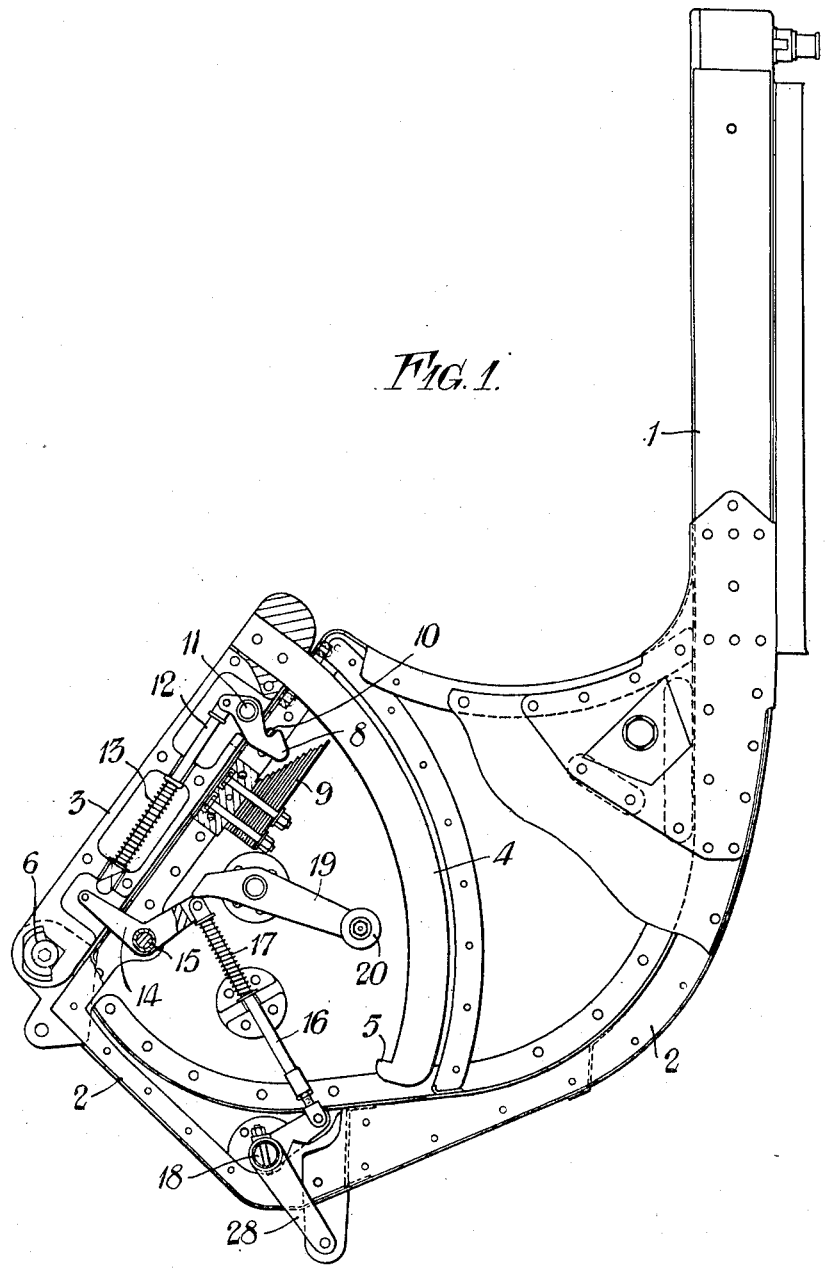

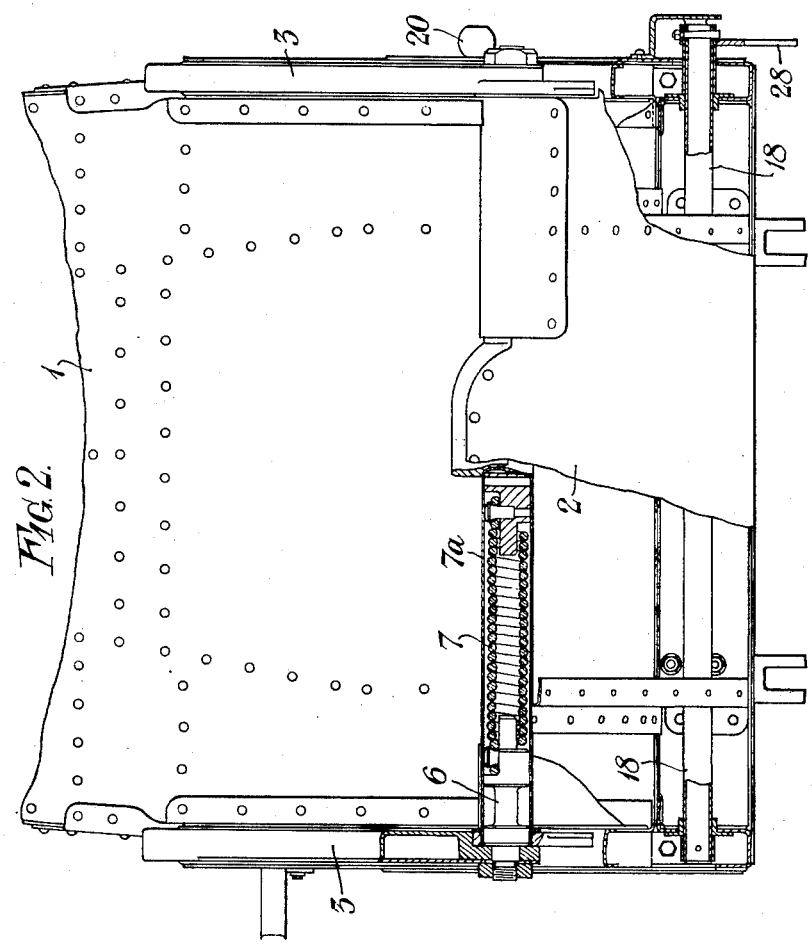

Jan. 5, 1954　　　　J. MARTIN　　　　2,665,089
EJECTION SEAT FOR AIRCRAFT

Filed May 22, 1951　　　　　　　　　　5 Sheets-Sheet 4

Inventor
JAMES MARTIN.
per Worth Wade
Attorney.

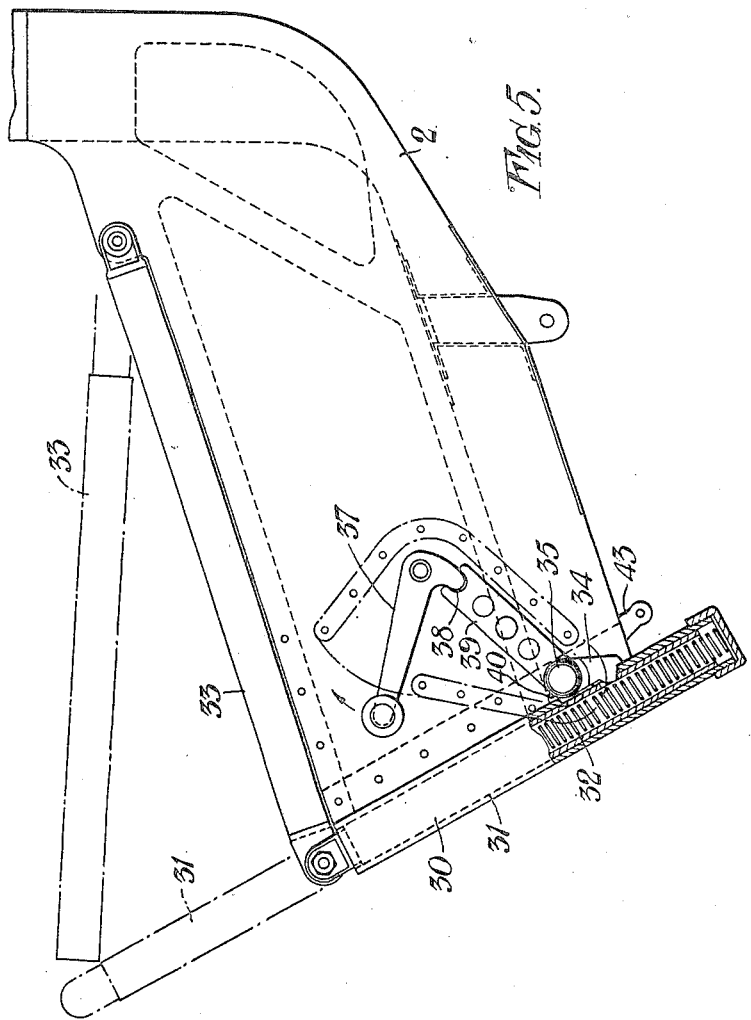

Patented Jan. 5, 1954

2,665,089

UNITED STATES PATENT OFFICE 2,665,089

EJECTION SEAT FOR AIRCRAFT

James Martin, Higher Denham, near Uxbridge, England

Application May 22, 1951, Serial No. 227,562

Claims priority, application Great Britain May 22, 1950

8 Claims. (Cl. 244—122)

The present invention relates to improvements in or relating to ejection seats for aircraft.

The invention is applied to ejection seats of the type which is adapted to be launched from an aeroplane or other aircraft with the occupant seated therein and mechanism is provided by which the seat is launched from the aircraft by means of an ejection unit actuated by pressure generated by one or more explosive cartridges.

One form of ejection seat to which the invention may be applied comprises a frame on which the seat is mounted, a guide adapted to be fixed in the aeroplane so as to be directed toward an outlet from which the seat may be ejected, an ejector gun operating between the seat frame and a fixed part of the aeroplane to eject the seat and its frame along the guide, a main parachute and a drogue parachute and seat harness, and means operable as the seat is ejected from the aircraft to carry out automatically and in correct sequence and timing the operations necessary to allow the pilot to descend on the main parachute.

Ejection seats of this kind are usually provided with thigh guards or side wings to prevent the airman's legs from being blown apart or separated by the airstream or wind pressure when the seat with the airman is ejected from the aircraft at high speed. However with certain arrangements of control column these thigh guards or side wings interfere with the required side to side movement of the said column.

According to the present invention there is provided thigh guards which remain in a retracted or folded position during normal flight thus allowing freedom of leg movement to the occupant of the seat and also full movement of the rigid type of control in use in some types of aircraft. On ejection of the seat the guards are automatically or manually caused to assume the extended position so as to carry out their intended function.

The invention will now be described with reference to the accompanying drawings which illustrate examples of the carrying into effect of the invention.

In the drawings:

Fig. 1 is a side view of an ejection seat with the invention applied thereto.

Fig. 2 is a front view of Fig. 1 with parts cut away.

Fig. 3 is a side view of an ejection seat showing the guard in the retracted and extended positions.

Fig. 5 is a side view of a modified construction, and

Fig. 6 is a perspective view of the control mechanism of Fig. 5.

Figure 4:
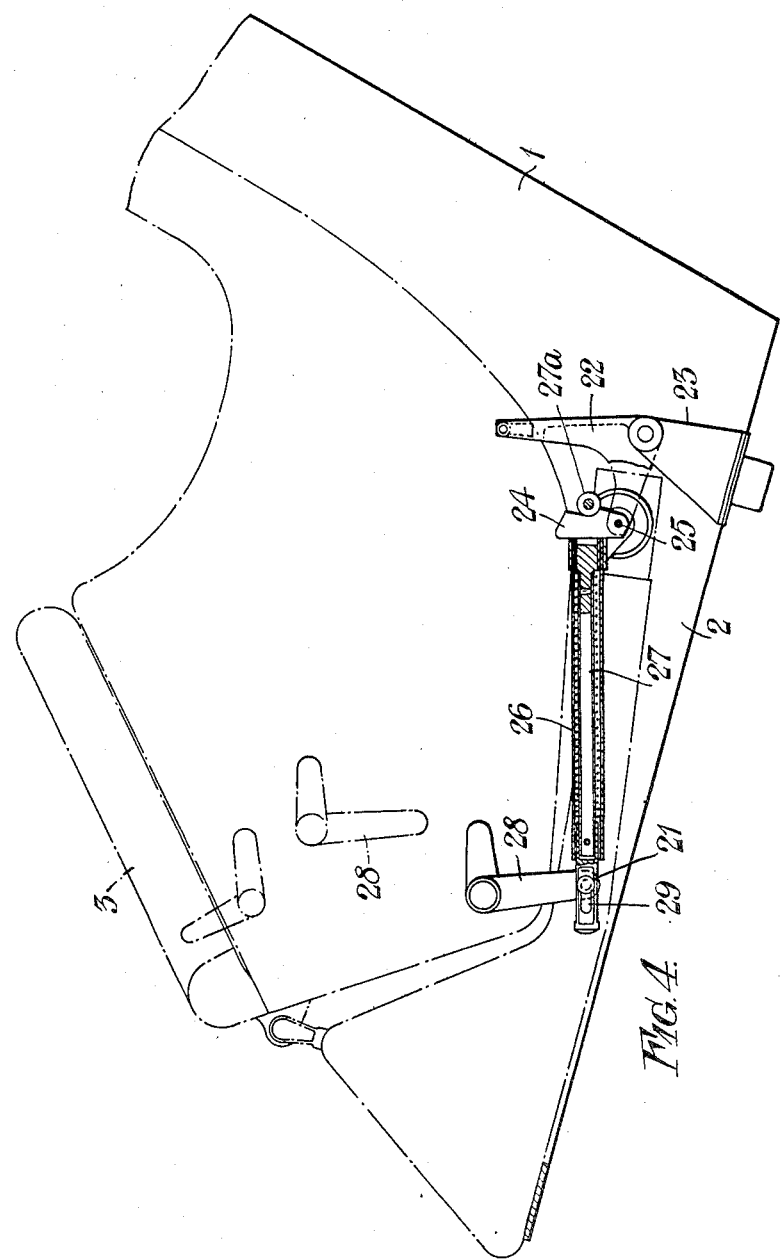
Fig. 4 is a side view with parts cut away illustrating the automatic release mechanism referred to later.

Referring to the construction illustrated in Figs. 1 and 2, there is a seat 1 with a seat pan 2. Two swinging arms or thigh guards 3, one on the port side and the other on the starboard side are pivoted on the forward corners of the seat pan 2. At the upper end of each arm is attached a curved strip or quadrant 4 having at its lower end a projection 5.

The arms 3 are mounted on two short spindles 6, the ends of which engage in torsion springs 7 in a casing 7a.

The inner ends of the springs are fixed to the seat pan structure 2.

Assuming that the guard arms 3 have been moved manually into the retracted positions, spring loaded hook catch members 8 pivoted to the arms serve to retain the arms retracted, and the torsion springs 7 are wound up. On disengaging the catches 8, by manual or automatic means as hereinafter described, the torsion springs 7 drive the guards into the extended or functioning positions, that is to say, the arms 3 move away from the seat pan and take with them the curved strips or quadrants 4. This is shown in Fig. 3, in which the full outline indicates the arms in the retracted positions and the dotted outline the arms in the extended positions.

When the arms are moved to the extended positions leaf spring buffers 9 attached to a part of the seat pan engage the projections 5 on the lower ends of the quadrants 4 thus limiting the forward movement of the guards and preventing damage to the seat pan structure.

As stated the retracted thigh guards are released by disengaging the catches 8. There will now be described the means whereby the catches are moved.

The catches 8 are held to the locked position, to keep the guards in the retracted position, by pins 10 mounted on the seat pan structure. The pins 10 engage the hooks of the catches 8. The catches 8 work about pivots 11. The ends of the catches remote from their hook parts are pinned to push rods 12 mounted in the arms 3. The push rods 12 are under the influence of springs 13, that is they are spring loaded, the springs serving to keep the hook parts normally in engagement with the pins 10.

Mounted on the seat pan structure are bell crank levers 14 fulcrumed at 15, the plain ends of which abut against the lower ends of the push rods 12.

The forked ends of the levers 14 are connected to push rods 16 which are under the bias of springs 17. The lower ends of the push rods 16 are connected by links which are mounted on a torque shaft or tube 18 crossing from side to side of the seat pan, connecting at either side of the seat pan through the links, the two push rods 16, levers 14, push rods 12 and hook levers or catches 8.

To manually release the catches 8 there is a lever 19 actuated by the pilot through a suitable control member 20. When the lever 19 is moved and the catches 8 released the torsion springs 7 will move the guards to the extended positions.

For automatic operation a mechanism shown in detail in Fig. 4 is provided. This consists of a rocker lever 22, pivoted at its centre on a bracket 23 mounted on the floor of the cockpit. At the upper end of the rocker lever 22 is attached a connection to the hood jettison control or some other suitable operative part of the seat ejection apparatus. The forward end of the rocker lever 22 is attached to a sear 24. The centre point 25 of this attachment is arranged to coincide with the axis of the seat pan height adjustment levers so that the seat pan 2 may be adjusted to suit the pilot without triggering the sear and releasing the guards, yet permitting the mechanism to function in any position of adjustment of the seat pan.

A control tube 26 is attached at its rear end to the axis point of the seat pan adjustment levers and is free to pivot about this point as the pan is adjusted. Within the control tube 26 is a spring loaded plunger rod 27 having a member 27a retained in the cocked position by the sear 24. The forward end of the rod 27 is attached to the actuating lever 28 on the end of the torque shaft or tube 18, Fig. 1. A slot 29 is provided on the forward end of the plunger rod 27 to provide free movement when manual operation is made.

As indicated in Fig. 4 the full outline indicates the position of the actuating lever 28 in the lowest position of the seat pan and the dotted outline its position when the seat pan is in top position. One swinging arm 3 and its bell crank lever are also indicated in dotted outline in this side view.

In automatic operation the sequence of operations is as follows:

When the hood jettison control is operated a connection therefrom would move the rocker lever 22 about its centre pivot thus withdrawing the sear 24 and permitting the plunger rod 27 to spring forward and move the actuating lever 28 which through the torque shaft 18 and linkage would release the hook catches 8 and permit the thigh guards 3, 4, to spring into the extended or out positions through the medium of the torsion springs 7.

A variant construction of the invention is shown in Figs. 5 and 6. In this construction tubular housings 30 are built into the seat pan structure 2, and form the front corners of the seat pan. Within each housing is a sliding tube 31 actuated by a spring 32.

The forward end of a telescopic radius arm 33 is attached to the top of the sliding tube 31, the rear end being attached to the seat pan.

The tube 31 and the arm 33 correspond to the arm 3 and the quadrant 4.

The inner sliding tube 31 is held in the retracted position by a catch member or pawl 34 freely mounted on a torque shaft 35 similar to the torque shaft 18. This member 34 is held in engagement with the tube 31 by torsion springs 36 on the shaft 35, the free ends of the springs being secured to the seat pan structure, that is to say the member 34 is spring loaded.

For manual actuation there is a pivoted bell crank lever 37 having one end working in a slot 38 of an arm 39, the latter being pinned to the torque shaft 35. On the shaft 35 are pegs 40 working in slots 41 in the pawls 34. Movement of the arm of the bell crank lever in the direction of the arrow 42, transmits rotary movement to the shaft 35 by reason of the pegs 40 bearing against the ends of the slots 41 whereby the pawls 34 are withdrawn from the sliding tubes 31, and the springs 32 drive the said tubes from the retracted position within the housings 30 to the position indicated by the dotted outline in Fig. 5 and at the same time the arms 33 are drawn out and the guard takes up its extended position.

For automatic actuation there is provided an arm 43 pinned to the shaft 35, which arm 43 is coupled up for movement to the canopy release control. This automatic mechanism may be substantially as described with reference to the first construction including a sear and allied parts.

The slots 41 in the catch members or pawls 34 through which the pegs emerge permit the pawls to move independently of the torque shaft 35 when pushing the guards from the extended position into the retracted position. Means may be provided to prevent the guard from opening inadvertently during servicing of the seat.

It will be apparent that the invention can be variously modified and changed within the scope of the appended claims.

I claim:

1. In an ejection seat for aircraft comprising in combination therewith thigh guards movably mounted on said seat between retracted and operative positions, spring means disposed between said seat and thigh guards operable to move said guards from the retracted position to said operative position, catch means interposed between said thigh guards and seat normally retaining the guards in said retracted position, lease mechanism operably associated with said catch means, and means interposed between said release mechanism and the catch means whereby on actuation of the release mechanism the catch means are disengaged to permit the spring means to become operative and move the guards from the retracted position to the operative position.

2. An ejection seat as recited in claim 1, in which said release mechanism is manually actuated.

3. An ejection seat as recited in claim 1 in which said release mechanism is actuated by an operative part of the seat ejection apparatus.

4. In an ejection seat for aircraft comprising in combination therewith thigh guards movably mounted on said seat between retracted and operative positions, each thigh guard consisting of a swinging arm pivoted to a part of the seat and a quadrant attached to said arm, spring means disposed between said seat and thigh guards operable to move said guards from the retracted position to said operative position, catch means interposed between said thigh guards and seat normally retaining the guards in said retracted position, release mechanism operably associated with said catch means, and means interposed between said release mechanism and the catch means whereby on actuation of the release mechanism the catch means are disengaged to permit the spring means to become operative and move the guards from the retracted position to the operative position.

5. In an ejection seat for aircraft comprising in combination therewith thigh guards movably mounted on said seat between retracted and operative positions, each thigh guard consisting of a sliding tube and a telescopic radius arm attached thereto and to a part of the seat, spring means disposed between said seat and thigh guards operable to move said guards from the retracted position to said operative position, catch means interposed between said thigh guards and seat normally retaining the guards in said retracted position, release mechanism operably associated with said catch means, and means interposed between said release mechanism and the catch means whereby on actuation of the release mechanism the catch means are disengaged to permit the spring means to become operative and move the guards from the retracted position to the operative position.

6. In an ejection seat for aircraft comprising in combination therewith thigh guards movably mounted on said seat between retracted and operative positions, each thigh guard consisting of a swinging arm pivoted to a part of the seat and a quadrant attached to said arm, spring means disposed between said seat and thigh guards operable to move said guards from the retracted position to said operative position, catch means interposed between said high guards and seat normally retaining the guards in said retracted position, release mechanism operably associated with said catch means, and push rods attached to the ends of the catch means and interposed between said release mechanism and the catch means whereby on actuation of the release mechanism the catch means are disengaged to permit the spring means to become operative and move the guards from the retracted position to the operative position.

7. In an ejection seat for aircraft comprising in combination therewith thigh guards movably mounted on said seat between retracted and operative positions, said thigh guards consisting of sliding tubes and telescopic radius arms attached thereto and to a part of the seat, tubular housings for said sliding tubes, the housings forming the front corners of the seat, spring means within said housings for moving said guards from the retracted position to said operative position, catch means interposed between said thigh guards and seat normally retaining the guards in said retracted position, release mechanism operably associated with said catch means, and means interposed between said release mechanism and the catch means whereby on actuation of the release mechanism the catch means are disengaged to permit the spring means to become operative and move the guards from the retracted position to the operative position.

8. In an ejection seat for aircraft comprising in combination therewith thigh guards movably mounted on said seat between retracted and operative positions, said thigh guards consisting of sliding tubes and telescopic radius arms attached thereto and to a part of the seat, tubular housings for said sliding tubes, the housings forming the front corners of the seat, spring means within said housings for moving said guards from the retracted position to said operative position, spring loaded catch means interposed between said thigh guards and seat normally retaining the guards in said retracted position, a torque shaft on which the catch means are freely mounted, release mechanism for actuating said torque shaft, and members on said torque shaft engaging the catch means whereby on actuation of the release mechanism the catch means are disengaged to permit the spring means to become operative and move the guards from the retracted position to the operative position.

JAMES MARTIN.

References Cited in the file of this patent

UNITED STATES PATENTS

| Number | Name | Date |
| --- | --- | --- |
| 1,027,764 | Rilleav | May 28, 1912 |
| 1,405,309 | Matthews | Jan. 31, 1922 |
| 1,486,813 | Tallman | Mar. 11, 1924 |
| 2,084,448 | Merchant | June 22, 1937 |
| 2,165,698 | Eyerly | July 11, 1939 |
| 2,346,871 | Provenzano | Apr. 18, 1944 |
| 2,502,470 | Martin | Apr. 4, 1950 |
| 2,528,532 | Martin | Nov. 7, 1950 |
| 2,577,817 | Schueder | Dec. 11, 1951 |